(12) United States Patent
Apte et al.

(10) Patent No.: US 7,840,856 B2
(45) Date of Patent: Nov. 23, 2010

(54) OBJECT INTROSPECTION FOR FIRST FAILURE DATA CAPTURE

(75) Inventors: Ajay A. Apte, Austin, TX (US); Hany A. Salem, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1977 days.

(21) Appl. No.: 10/290,212

(22) Filed: Nov. 7, 2002

(65) Prior Publication Data

US 2004/0153847 A1   Aug. 5, 2004

(51) Int. Cl.
   *G06F 11/00*   (2006.01)
(52) U.S. Cl. .......................................... 714/48; 714/26
(58) Field of Classification Search .................. 714/48, 714/25, 26

See application file for complete search history.

(56) References Cited

U.S. PATENT DOCUMENTS

| | | | |
|---|---|---|---|
| 4,034,194 A | 7/1977 | Thomas et al. | |
| 4,322,846 A | 3/1982 | Carroll et al. | |
| 5,107,500 A | 4/1992 | Wakamoto et al. | |
| 5,170,480 A | 12/1992 | Mohan et al. | |
| 5,331,476 A | 7/1994 | Fry et al. | |
| 5,388,252 A | 2/1995 | Dreste et al. | |
| 5,423,025 A | 6/1995 | Goldman et al. | |
| 5,448,722 A | 9/1995 | Lynne et al. | |
| 5,539,877 A | 7/1996 | Winokur et al. | |
| 5,602,990 A | 2/1997 | Leete | |
| 5,768,499 A | 6/1998 | Treadway et al. | |
| 5,771,240 A | 6/1998 | Tobin et al. | |
| 5,862,322 A | 1/1999 | Anglin et al. | |
| 5,956,714 A | 9/1999 | Condon | |
| 5,978,594 A | 11/1999 | Bonnell et al. | |
| 5,983,364 A * | 11/1999 | Bortcosh et al. | 714/25 |
| 6,028,593 A | 2/2000 | Rosenberg et al. | |
| 6,105,067 A | 8/2000 | Batra | |
| 6,134,676 A | 10/2000 | VanHuben et al. | |
| 6,170,067 B1 | 1/2001 | Liu et al. | |
| 6,182,086 B1 | 1/2001 | Lomet et al. | |
| 6,249,755 B1 | 6/2001 | Yemini et al. | |

(Continued)

FOREIGN PATENT DOCUMENTS

EP   0897151 A1   2/1999

(Continued)

OTHER PUBLICATIONS

Horstmann, et al., Core Java 2, vol. 1, ch. 11, pp. 635-691 (2001).

(Continued)

*Primary Examiner*—Yolanda L Wilson
(74) *Attorney, Agent, or Firm*—David A. Mims, Jr.; Paul D. Heydon

(57) ABSTRACT

A solution provided here comprises transferring control to at least one data-capture component when an error occurs in a production environment, performing introspection upon an object associated with the error, and capturing data from the object. The captured data is associated with the error, and the capturing is performed at least partially through introspection. Methods for error—handling and providing diagnostic data, systems for executing such methods, and instructions on a computer-usable medium, for executing such methods, are provided.

20 Claims, 4 Drawing Sheets

U.S. PATENT DOCUMENTS

| | | | |
|---|---|---|---|
| 6,343,236 | B1 | 1/2002 | Gibson et al. |
| 6,363,497 | B1 | 3/2002 | Chrabaszcz |
| 6,442,694 | B1 | 8/2002 | Bergman et al. |
| 6,532,552 | B1 | 3/2003 | Benignus et al. |
| 6,574,744 | B1 | 6/2003 | Kantz et al. |
| 6,681,344 | B1 * | 1/2004 | Andrew ................ 714/38 |
| 6,738,928 | B1 * | 5/2004 | Brown ................ 714/26 |
| 6,742,141 | B1 | 5/2004 | Miller |
| 7,007,200 | B2 | 2/2006 | Salem |
| 7,080,287 | B2 | 7/2006 | Salem |
| 2002/0144181 | A1 * | 10/2002 | Hicks et al. ................ 714/25 |
| 2002/0144187 | A1 | 10/2002 | Morgan et al. |
| 2002/0191536 | A1 | 12/2002 | LaForge et al. |
| 2002/0194550 | A1 * | 12/2002 | Lopke ................ 714/48 |
| 2003/0051191 | A1 * | 3/2003 | Circenis et al. ................ 714/25 |
| 2003/0120968 | A1 * | 6/2003 | Andress et al. ................ 714/25 |
| 2004/0025077 | A1 | 2/2004 | Salem |
| 2004/0059966 | A1 * | 3/2004 | Chan et al. ................ 714/48 |
| 2005/0188285 | A1 | 8/2005 | Fellenstein et al. |

FOREIGN PATENT DOCUMENTS

| | | |
|---|---|---|
| JP | 4065729 A | 3/1992 |
| WO | WO00/68793 | 11/2000 |

OTHER PUBLICATIONS

Crandall, D. R. and Lindeman, D. F., "Self-Initiating Diagnostic Program Loader from Failed Initial Program Load I/O Device," reproduced from Research Disclosure, Jun. 1991, N.

J. P. Bigus et al., "ABLE: A Toolkit for Building Multiagent Autonomic Systems," IBM Systems Journal, vol. 41, No. 3, p. 350 (2002).

IBM Corporation, "alphaWorks web page: Agent Building and Learning Environment," available at http://www.alphaWorks.ibm.com/tech/able, accessed Oct. 15, 2003.

IBM Corporation, An Architectural Blueprint for Autonomic Computing, (2003), available at http://www.ibm.com/autonomic/pdfs/ACwpFinal.pdf, accessed Sep. 25, 2003.

* cited by examiner

US 7,840,856 B2

OBJECT INTROSPECTION FOR FIRST FAILURE DATA CAPTURE

CROSS-REFERENCES TO RELATED APPLICATIONS, AND COPYRIGHT NOTICE

The present application is related to co-pending applications, entitled First Failure Data Capture, application Ser. No. 10/195,181, filed on Jul. 11, 2002, Error Analysis Fed from a Knowledge Base, application Ser. No. 10/195,182, filed on Jul. 11, 2002, and Method and Apparatus for the Dynamic Tuning of Recovery Actions in a Server by Modifying Hints and Symptom Entries from a Remote Location, application Ser. No. 10/210,361, filed on Jul. 31, 2002. These co-pending applications are assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to error handling, recovery, and problem solving, for software and information-handling systems.

BACKGROUND OF THE INVENTION

Various approaches have been proposed for handling errors or failures in computers. In some examples, error-handling is not separated from hardware. Other examples do not address how to gather useful diagnostic information about errors or failures.

Unfortunately, conventional problem-solving for software often involves prolonged data-gathering and debugging. Collection of diagnostic data, if done in conventional ways, may impact software performance in unacceptable ways, and may have to be repeated several times until a problem's cause is revealed. Thus there is a need for automated solutions that provide useful diagnostic data, leading to a useful response; at the same time, the burdens of reproducing problems and tracing problems need to be reduced, and the destabilizing effects of major code revisions need to be avoided.

SUMMARY OF THE INVENTION

A solution to problems mentioned above comprises transferring control to at least one data-capture component when an error occurs in a production environment, performing introspection upon an object associated with the error, and capturing data from the object. The captured data is associated with the error, and the capturing is performed at least partially through introspection.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used. Some of the examples that follow have been implemented by using object-oriented programming with the JAVA programming language. However, the invention could be implemented with another programming language that allows introspection; C# and Python are two examples of languages that might be used. Some of the examples that follow have been implemented for handling errors in web application server software; however, the invention could be implemented for handling errors in any kind of computer system, software product or software component.

The following are definitions of terms used in the description of the present invention and in the claims:

"Catch statement" means a section of code that contains error-handling code.

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Customize" means to adapt, adjust or tune.

"Error" means any event or occurrence that may be unexpected, undesirable, or incorrect.

"First failure data capture" (FFDC) refers to automated solutions that are typically "on" and ready to work the first time an error or failure occurs; it also refers to reducing the burdens of problem reproduction and repetitive data capture.

"Incident" means any event that may be perceived as a cause of past, present, or future trouble.

"Introspection," sometimes called "reflection," means discovering or providing information about an object's characteristics, such as data, methods, functions, procedures, behavior, state, or identity.

"Outputting" means producing, transmitting, or turning out in some manner, including but not limited to writing to disk, printing on paper, or displaying on a screen, or using an audio device.

"Production environment" means any set of actual working conditions, where daily work or transactions take place.

"State" means any set of stored data at some point in time.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
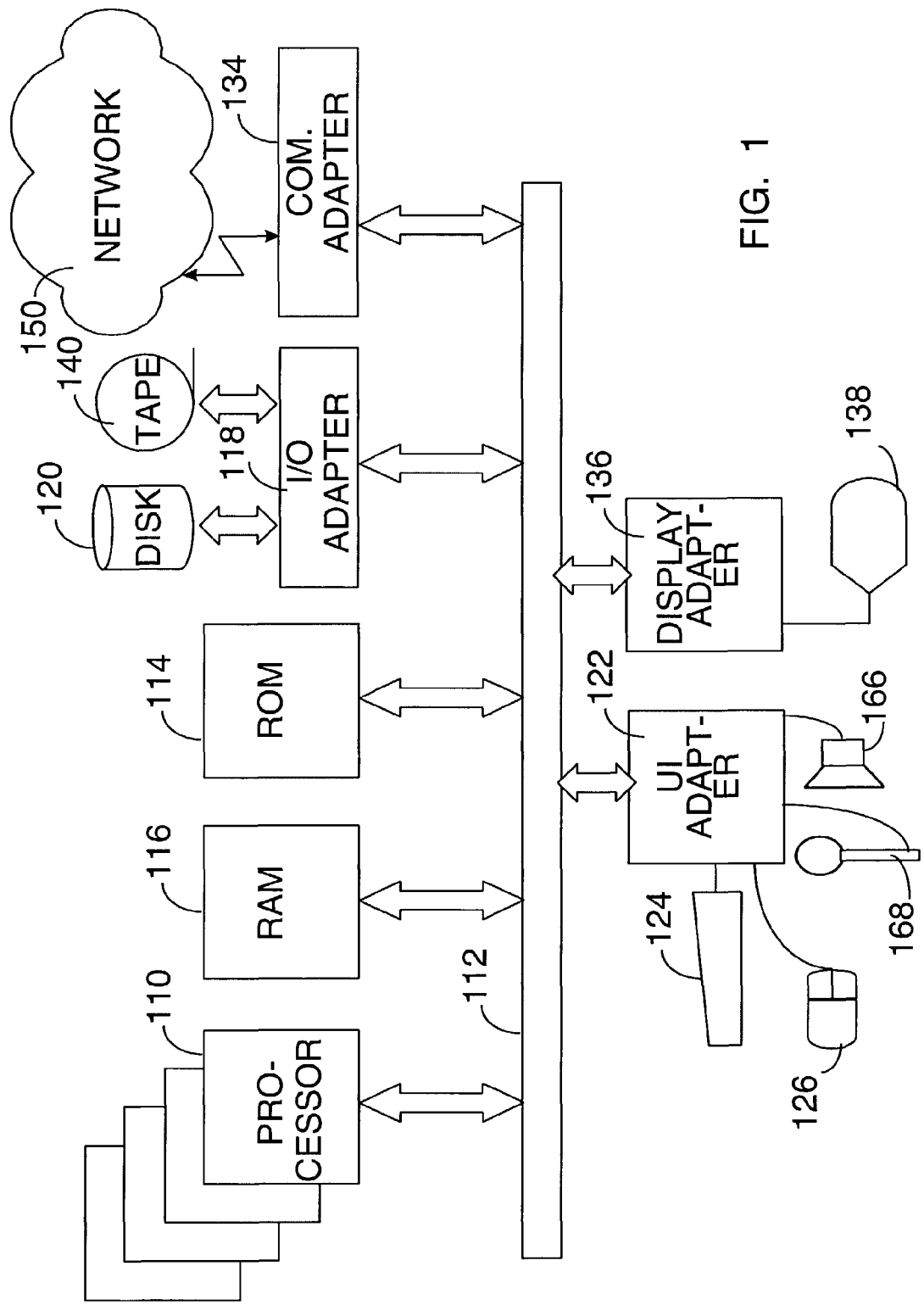
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
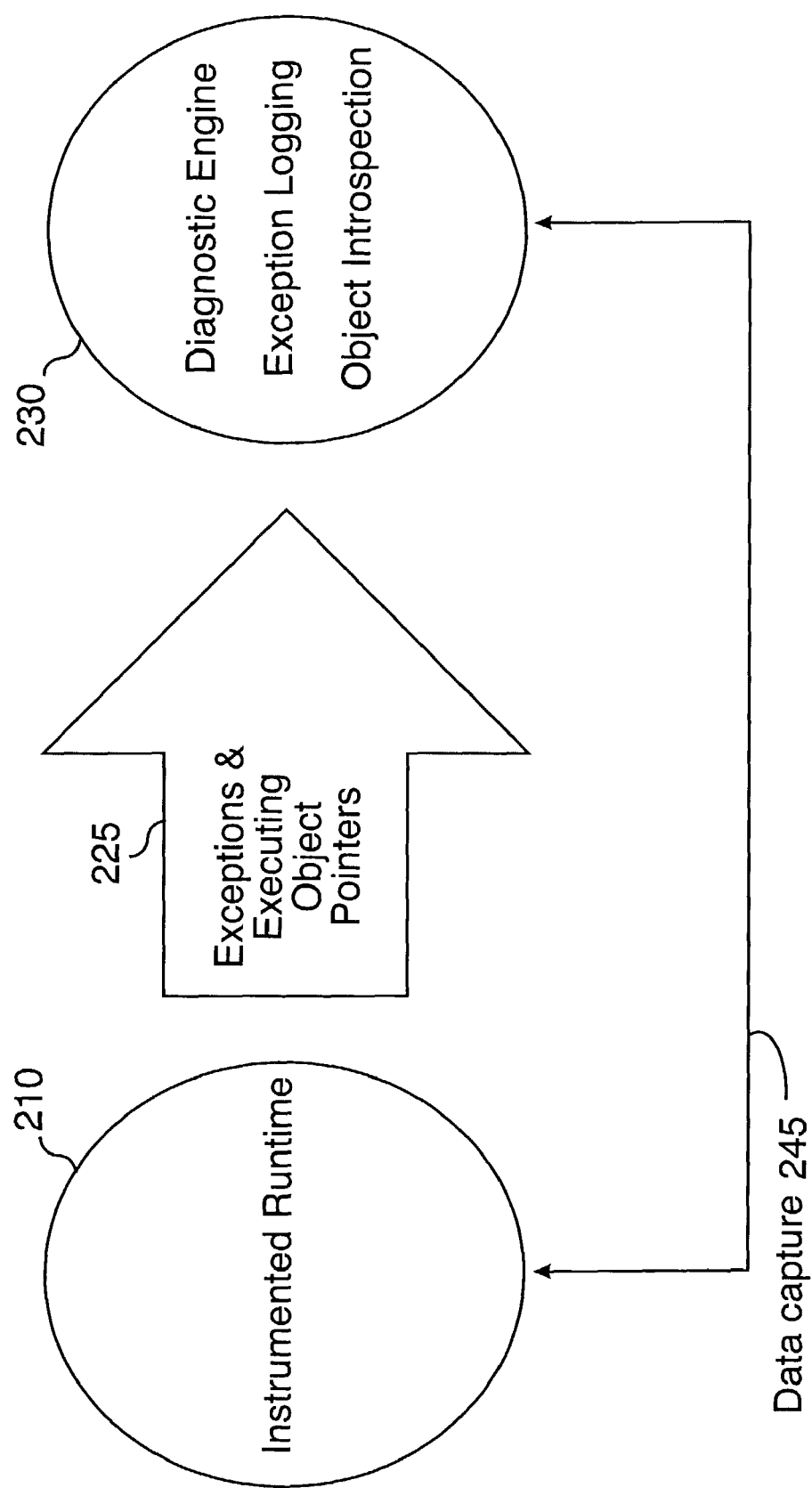
FIG. 2 is a block diagram illustrating a simplified example of a method and system for handling errors according to the present invention.

FIG. 2 is a block diagram illustrating a simplified example of a method and system for handling errors according to the present invention. To begin with an overview, this example involves: transferring control (arrow 225) to at least one data-capture component (symbolized by component 230) when an error occurs in a production environment; performing introspection upon an object (in runtime 210) associated with the error; and capturing data (symbolized by double-headed arrow 245) from the object. The captured data is associated with the error, and the capturing at 245 is performed at least partially through introspection. Compared with a process dump for example, capturing data at 245 from the object that encounters the error is more specific. It yields a quantity of data that is not too large, and tends to yield data that is more beneficial for diagnosing a problem.

Turning now to some details of FIG. 2, component 230 symbolizes various possible data—capture components, such as a diagnostic engine, an exception—logging component, or an object-introspection service. For example, an introspection service (at 230) may be provided, that recursively performs introspection and captured data (arrow 245), from a current object (in runtime 210), and from additional objects (in runtime 210), if any additional objects are associated with the current object. The "current object" is the object associated with the error in this example. One or more objects might be imbedded in the current object, for example. The current object might contain a link or reference to one or more additional objects. The "current object" may be thought of as an object that encounters an error, or an object containing code that is executed when the error occurs (in runtime 210).

An example implementation involves providing runtime features (in runtime 210) for data capture, providing an introspection service (at 230) and making a current object (in runtime 210) available to said introspection service. A code parser parses "catch" statements in code (in runtime 210), and adds to the "catch" statements a call to the introspection service at 230. The call includes (as arguments) pointers or references to the current object and the exception (symbolized by arrow 225). The example implementation minimizes in-line code (in runtime 210) for data capture. The term "instrumented runtime" is used for runtime 210, after adding to the "catch" statements a call to the introspection service.

Capturing data at 245 comprises actions such as capturing the state of said object, capturing data from at least one instance field in said object, capturing an exception, and capturing a call sequence. Consider an example (involving hypothetical objects in runtime 210) where object A calls object B, which calls object C, which calls object D, which calls object E. Object E encounters an error. There are "catch" statements in object B and object E. An example implementation would capture (arrow 245) and log the following:

An exception reported by object E, which shows the call sequence A-B-C-D-E.

The state of object E.

An exception reported by object B.

The state of object B.

Consider another example involving objects in runtime 210. In this hypothetical online banking example, a set of applications are designed to allow bank customers to conduct financial transactions via the Internet. There could be an object identified as "User A's Accounts" (in runtime 210), containing data such as User A's name, address, account balances, interest rates, etc. Perhaps due to a programming error or data entry error, a value of zero is unexpectedly stored in one of these instance fields in "User A's Accounts." Later, while User A attempts to conduct a financial transaction, the online banking system automatically invokes a method (for marketing purposes) to display an advertisement to User A. This advertisement is designed to contain unique information for User A, based on a ratio involving values stored in two instance fields in "User A's Accounts." Because a value of zero is unexpectedly stored in one of these instance fields, the object "User A's Accounts" (in runtime 210) encounters an error when there is an attempt to divide a value by zero.

When the error occurs in this example, control is transferred (arrow 225) to a data-capture component 230 (which includes an introspection service). References to the current object "User A's Accounts" and the exception are passed (arrow 225) to data-capture component 230. Data-capture component 230 performs introspection upon object "User A's Accounts" and captures data (arrow 245) from the object (in runtime 210). For example, this may involve capturing the state of the object, i.e. capturing the set of values stored in instance fields such as User A's name, address, account balances, interest rates, etc.

The example could be extended to include recursively performing introspection and capturing data (arrow 245), from object "User A's Accounts" (in runtime 210), and from additional objects (such as object "User A's Savings Account" and object "User A's Checking Account" in runtime 210), where additional objects are associated with object "User A's Accounts."

In this example, the performing introspection and capturing data are accomplished immediately after the error occurs, and the performing introspection and capturing data are accomplished even if the error produces a failure in the online banking application.

The example could be extended to include identifying an opportunity to improve the performance of the online banking applicabon, based on the captured data. For example, the code to customize the advertisement could be rewritten, to test for a condition where a value of zero is stored in one of the instance fields, and avoid an attempt to divide a value by zero.

Figure 3:
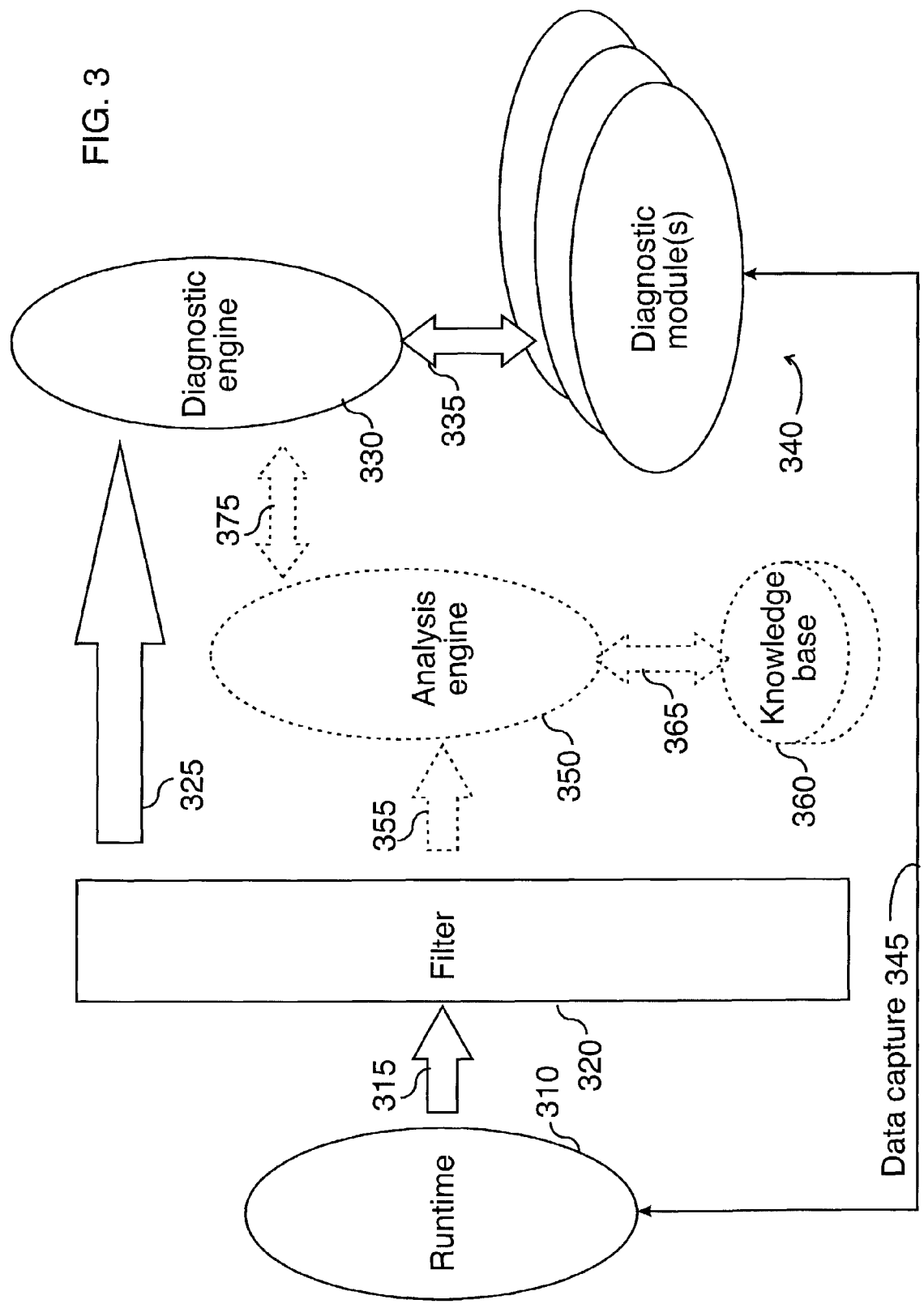
FIG. 3 is a block diagram illustrating another example of a method and system for handling errors, involving an architecture for first failure data capture.

FIG. 3 is a block diagram illustrating another example of a method and system for handling errors, involving an architecture for first failure data capture. To begin with an overview, the example in FIG. 3 includes a transfer of control (arrow 315) to at least one data-capture component when an error occurs, and includes introspection and data capture (at 345). FIG. 3 shows filter 320 selecting an error or incident that requires further processing, and one or more diagnostic modules at 340 capturing data on a thread that encounters the error or incident, from runtime 310. The captured data is associated with the error, and the capturing (at 345) is performed at least partially through introspection. FIG. 3 shows diagnostic module(s) 340 calling (arrow 335) diagnostic engine 330's services when appropriate to request introspection, thread dumps, core dumps etc. Features for data capture are provided in runtime 310. Arrows 325 and 355 symbolize flow of selected incidents in FIG. 3.

To begin a more detailed description of the example in FIG. 3, consider how an application or software component (symbolized by runtime 310) might utilize such a method and system for handling errors. Control flow for errors or incidents is orchestrated by the diagnostic engine 330 (DE). The DE 330 controls the flow among diagnostic modules 340 for data collection. The diagnostic engine 330 also provides platform-specific utilities for diagnostic modules 340, such as introspection. Arrow 335 shows communication between diagnostic engine 330 and diagnostic modules 340. One or more diagnostic modules 340 per software component are provided. Data is made available to diagnostic modules 340, at key places in the code, to help collect data if an error or incident occurs.

An example implementation involves providing runtime features (in runtime 310) for data capture. These features comprise code transferring control (arrow 315) to at least one data-capture engine when an error or incident occurs, and making data available to diagnostic module(s) 340. An example implementation involves minimizing in-line code for data capture, or keeping code for data capture substantially separate from in-line paths, symbolized by showing diagnostic engine 330 and one or more diagnostic modules at 340 separate from runtime 310 in FIG. 3. Data capture (symbolized by double-headed arrow 345) comprises actions such as introspection, capturing an object's state, producing a thread dump, producing a process dump, and producing a core dump.

Customization may be implemented by using analysis engine 350 and knowledge base 360. These two components, along with arrows 355, 365, and 375 (arrows showing communication with other components), are drawn in broken lines in FIG. 3, to symbolize that these are optional features. Using these optional features is a way of customizing data capture, based on a particular error or incident's characteristics. In an example implementation, analysis engine 350 compares a current error or incident to known error or incidents in knowledge base 360. If a match is found in knowledge base 360, information that is relevant to the current error or incident is retrieved from knowledge base 360. This retrieved information is used to customize data capture 345. This information is referred to as "directives."

Filter 320 (also known as a high performance filter or HPF) is a first recipient of incidents, errors, or events; it is a means for selecting errors or incidents that require further processing. Filtering is done according to criteria such as the severity of an error, or the type of exception. An incident object is created by the filter and passed to other core FFDC entities.

Calls from the runtime 310 are made to a method to forward exceptions to the filter 320. This is a method that is injected into runtime code of various components to participate in FFDC. These calls are made on error paths that are candidates for FFDC. For example, a call such as:

com.ibm.ffdc.hpf.performFFDC(String msg, Exception exception, Object this);

may be added to "catch" statements, to transfer control (arrow 315) to data-capture components.

The filter 320 locates a diagnostic engine 330 (DE) for the thread. The DE 330 provides a cache of recent errors or incidents that played a role in the decision for continuing FFDC processing, or simply returning control to the runtime 310 without further processing. If FFDC processing is to be continued, an Incident object is created. An analysis engine (AE) 350 is located, if one is configured. A method to analyze the incident (e.g. AE.analyze(Incident) ) is called and directives might be found. These along with the Incident and the object pointer are passed to the DE 330.

The diagnostic engine 330 is responsible for the distribution of an incident to the corresponding component. The DE 330 controls the flow among diagnostic modules 340 for data collection. The diagnostic engine 330 is a dynamic class loader, parent, and invoker of diagnostic modules 340. The diagnostic engine 330 also provides platform-specific utilities for diagnostic modules 340, such as introspection, thread dump, core dump, etc., that diagnostic modules 340 could call for data collection. The diagnostic engine 330 provides common methods for diagnostic modules 340. One instance of a diagnostic engine 330 is created per thread.

Object introspection is a service provided to dump the contents of an object (when the object is not recognized by a diagnostic module 340, for example). This service could also be used to navigate and dump objects that are instance data of the object to a certain depth. Below are examples of DE methods that implement this service:

DE.dumpContents(Object o, int depth, int maxobjects)
DE.dumpContents(Object o, int depth) //a configuration setting will be used to specify max objects
DE.dumpContents(Object o) //same as above and depth will be set to 1.

Diagnostic module(s) 340 (DM) are a means for capturing data; they are a data-gathering class for a component or sub-component. Diagnostic module(s) 340 are organized into a single class, rather than implementing disparate routines in various places of component code to handle incidents. DM 340 code is kept separate from in-line paths. Diagnostic module(s) 340 provides data that is beneficial to diagnose a problem. Diagnostic module(s) 340 are a means for providing output, which for example may comprise providing captured data in a persistent form, describing captured data, and describing a context for captured data, whereby problem-solving is promoted.

Corrective action could be accomplished through diagnostic module 340. Corrective action could be automatic, or could involve some human intervention. For example, if FIG. 3 involved a broken network connection to a directory, a directive such as "try to reconnect to a directory" might be retrieved from knowledge base 360. Thus, by automatically following this directive, a security function at 310 could be reconnected to a directory. Obtaining a proper directive and taking corrective action could be accomplished through a security diagnostic module at 340.

Consider other examples of corrective action: issuing a warning to the Java virtual machine or operating system about a condition (e.g. resource shortage) that contributed to the incident, or issuing an action message to the operator. In another example of corrective action or self-healing, a diagnostic module 340 may request an automated download and application of a fix, that could be made effective instantly or at the next restart.

Consider an example of customized data capture in a production environment. Directives could give a troubleshooter the flexibility to request additional data through introspection, under certain conditions. This could be achieved with no code changes in a diagnostic module 340 operating in a production environment. Directive strings could be added to a knowledge base 360.

Figure 4:
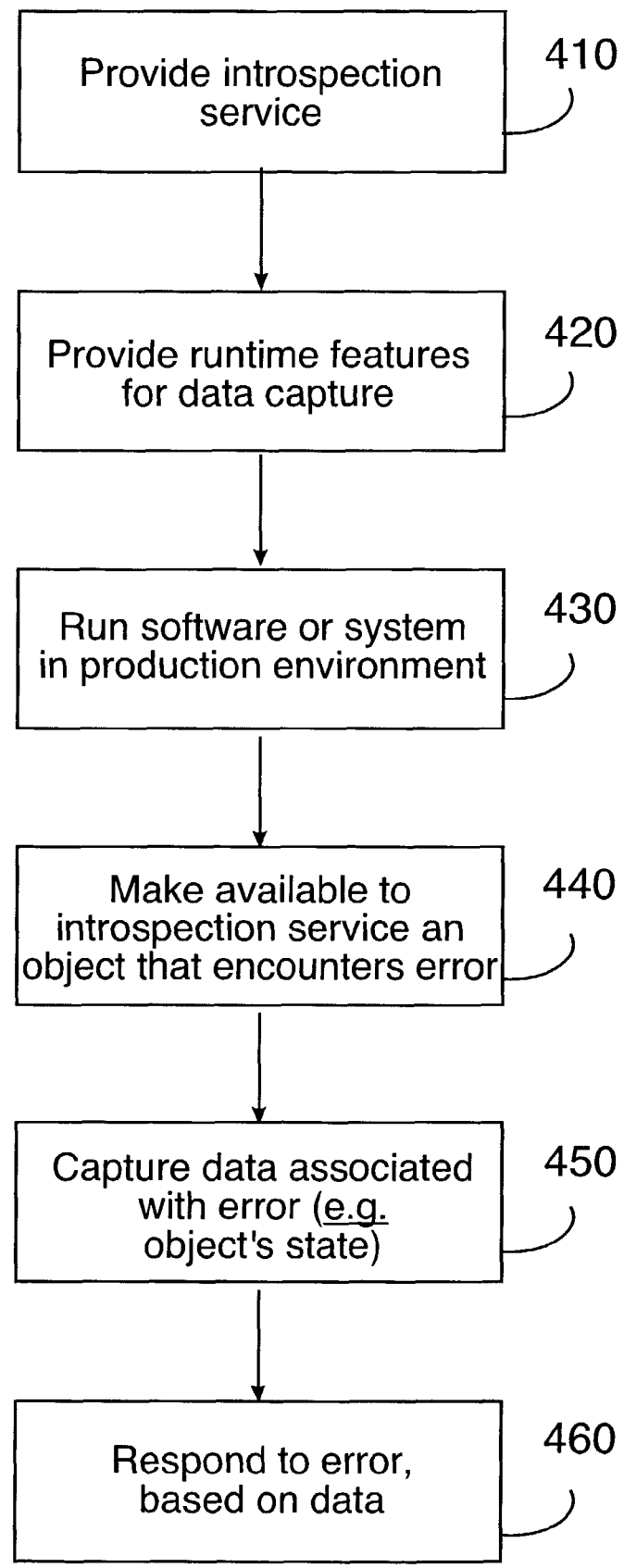
FIG. 4 is a flow chart illustrating an example of a method for handling errors according to the present invention.

FIG. 4 is a flow chart illustrating an example of a method for handling errors according to the present invention. This example begins at block 410, providing an introspection service. In an example implementation, a recursive introspection service is provided, that performs introspection and captures the state of the current object, and any imbedded objects. An adjustable depth limit for recursion may be useful, to avoid too many levels of recursion that would result in capturing too much data. For example, a default setting of about three levels of recursion may be useful for the depth limit. However, the depth limit could be adjusted to other values.

At block 410, a customized introspection service, with unique features, could be developed. On the other hand, an introspection service may be implemented with well-known techniques available in JAVA or some other programming language. Reference is made to the book by Cay S. Horstmann and Gary Cornell, *Core Java* 2, Vol. 1 (Sun Microsystems Press, 2001). Chapter 11 of that book, at pages 659-660, provides examples of code to get the state of a current object, or to enumerate and print all data fields of an object.

The example in FIG. 4 continues at block 420, providing runtime features for data capture. In an example implementation, each "catch" statement in a software product's runtime is instrumented with a method call, to transfer control to a data-capture component when an error occurs. A parsing tool may be run against source code to inject a method call. This has the benefit of reducing development impact. This parsing tool could also be run against new or modified code.

The example in FIG. 4 continues at block 430, running the software or system in a production environment. This example is not only appropriate for de-bugging a software product before it is released to end users. This example is aimed at errors occurring when end users put the software or system to work in a production environment.

The example in FIG. 4 continues at block 440, making available to the introspection service an object that encounters the error. For example, a call to the introspection service may include (as an argument) a pointer or reference to the current object. This is mentioned above in the descriptions of FIGS. 2 and 3.

The example in FIG. 4 continues at block 450, capturing data associated with an error. This may involve transferring control to at least one data-capture component when an error occurs in a production environment, performing introspection upon an object associated with the error, and capturing data from the object. For example, data from one or more instance fields in an object, or an object's complete state, may be captured. One kind of data that could be captured is instance data. This is data that may only be accessible by starting with the object that encounters the error. A good example would be the data in a stateful object. Additionally, object navigation is possible for data capture. For example, an instance of an Enterprise Java Bean could lead to its home, which could lead to the container, etc.

The example in FIG. 4 concludes at block 460: responding to an error, based on captured data. This may involve utilizing the captured data for problem-solving, identifying an opportunity to improve the performance of an application, based on the captured data, taking corrective action in response to the error, based on the captured data, or some combination of these actions. Some examples of responses are given above in the descriptions of FIGS. 2 and 3.

Regarding FIG. 4, the order of the operations described above may be varied. For example, it is within the practice of the invention for block 420, providing runtime features for data capture, to occur before, or simultaneously with, block 410, providing an introspection service. Those skilled in the art will recognize that blocks in FIG. 4, described above, could be arranged in a somewhat different order, but still describe the invention. Blocks could be added to the above-mentioned diagrams to describe details, or optional features; some blocks could be subtracted to show a simplified example.

In conclusion, we have shown examples of solutions for error-handling and providing diagnostic data.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modificatons as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for handling errors in a computer system, said method comprising:
   transferring control to at least one data-capture component when an error occurs in a production environment;
   performing introspection upon an object associated with said error; and
   capturing data from said object, wherein said data is associated with said error, and wherein said capturing is performed at least partially through said introspection.

2. The method of claim 1, further comprising:
recursively utilizing said performing introspection and said capturing data, for objects imbedded in said object associated with said error.

3. The method of claim 1, further comprising:
recursively utilizing said performing introspection and said capturing data, for at least one additional object, wherein said at least one additional object is associated with said object associated with said error.

4. The method of claim 1, wherein said object contains code that is executed when said error occurs.

5. The method of claim 1, further comprising:
providing runtime features for data capture;
providing an introspection service; and
making said object available to said introspection service.

6. The method of claim 5, wherein said providing runtime features further comprises:
utilizing at least one catch statement; and
adding to said at least one catch statement a call to said introspection service.

7. The method of claim 5, wherein said providing runtime features further comprises:
minimizing in-line code for said data capture.

8. The method of claim 1, wherein said captured data is selected from the group consisting of the state of said object, at least one instance field in said object, an exception, and a call sequence.

9. The method of claim 1, wherein:
said performing introspection and said capturing data are accomplished immediately after said error occurs; and
said performing introspection and said capturing data are accomplished even if said error produces a failure.

10. The method of claim 1, further comprising at least one action chosen from:
utilizing said data for problem-solving;
identifying an opportunity to improve the performance of an application, based on said data; and
taking corrective action in response to said error, based on said data.

11. A system for handling errors, said system comprising:
means for transferring control to at least one data-capture component when an error occurs in a production environment;
means for performing introspection upon an object associated with said error; and
means for capturing data from said object, wherein said data is associated with said error, and said capturing is performed at least partially through said introspection.

12. The system of claim 11, further comprising:
means for recursively utilizing said means for performing introspection and said means for capturing data, for at least one additional object, wherein said at least one additional object is associated with said object associated with said error.

13. The system of claim 11, wherein said means for capturing data is selected from the group consisting of means for capturing the state of said object, means for capturing data from at lest one instance field in said object, means for capturing an exception, and means for capturing a call sequence.

14. The system of claim 11, wherein:
said means for performing introspection and said means for operate immediately after said error occurs; and
said means for performing introspection and said means for capturing data operate if said error produces a failure.

15. The system of claim 11, further comprising:
means for taking corrective action in response to said error, based on said data.

16. A computer-usable medium having computer-executable instructions for handling errors, said computer-executable instructions comprising:
means for transferring control to at least one data-capture component when an error occurs in a production environment;
means for performing introspection upon an object associated with said error; and
means for capturing data from said object, wherein said data is associated with said error, and wherein said capturing is performed at least partially through said introspection.

17. The computer-usable medium of claim 16, further comprising:
means for recursively utilizing said means for performing introspection and said means for capturing data, for at least one additional object, wherein said at least one additional object is associated with said object associated with said error.

18. The computer-usable medium of claim 16, wherein said means for capturing data is selected from the group consisting of means for capturing the state of said object, means for capturing data from at lest one instance field in said object, means for capturing an exception, and means for capturing a call sequence.

19. The computer-usable medium of claim 16, wherein:
said means for performing introspection and said means for operate immediately after said error occurs; and
said means for performing introspection and said means for capturing data operate if said error produces a failure.

20. The computer-usable medium of claim 16, further comprising:
means for taking corrective action in response to said error, based on said data.

* * * * *